Jan. 22, 1963    P. K. LANGSETMO    3,074,293
BALANCING DEVICE
Filed Oct. 15, 1959

INVENTOR.
PEDER K. LANGSETMO
BY
Moore, White & Burd
ATTORNEYS

United States Patent Office 3,074,293
Patented Jan. 22, 1963

3,074,293
BALANCING DEVICE
Peder K. Langsetmo, Minneapolis, Minn., assignor to The Strong-Scott Manufacturing Company, Minneapolis, Minn., a corporation of Minnesota
Filed Oct. 15, 1959, Ser. No. 846,724
4 Claims. (Cl. 74—573)

This invention is a device for balancing rotating shafts.

Heretofore balancing rotating shafts has been a difficult and expensive procedure. Rotating mechanisms are designed, when possible, to have about equal weight spaced diametrically around the shaft so that, in rotation, centrifugal forces generated in the shaft are approximately canceled. Since it is almost impossible to fabricate shafts that are in balance by such common means of manufacturing as forging and casting, it is customary to finally balance these units by cutting away excess material in noncritical areas.

Balance is determined by laying the shaft or the rotating member to be balanced on knife edges to see whether it will stay at any given position. A tendency of the shaft to always roll with a given portion down indicates excess weight which is removed by trial and error cutting, usually in the form of drilling wells. This method of balancing accounts for the seemingly useless wells drilled in rotating mechanisms in an apparently random manner with no obvious concern for location or depth. After each cut is made, based on the judgment of the person doing the balancing, a new check of the balance is made and the procedure continued until the shaft will stay in any position in which it is placed on the knife edges. If the original cutting is inadequate or becomes so through wear, corrective cutting requires disassembly of the device.

Dynamic balancing of a shaft carrying a plurality of discs, paddles, beaters, or the like is achieved by means of a dynamic balancing machine. The machine indicates at what angular position on the shaft weight must be added in order to dynamically balance the shaft. Former practice was to add weight to elements of the shaft either mechanically or by means of welding or the like and then rechecking the balance until final dynamic balance was achieved. In the case of shafts carrying a plurality of beaters or mixers usually the weight was added to one or more of these beaters in order to achieve the proper angular addition of weight to the shaft. Such correction of balance of the assembled rotating shaft required careful notation of where weight was added in order to allow specially weighted units to be used for replacement when that became necessary.

Balancing techniques such as those just described are slow, costly, and burdensome. By using the device of the present invention, balancing of rotating structures can be accomplished without disassembling the device and without any cutting away material from an otherwise finished and usable device. Furthermore, manufacture and repair are simplified in that no special weighted paddles or beaters are necessary on shafts using them. Thus, the original manufacture of the device is made easier and replacement is also less burdensome. In addition, when the device is to be used in a mixing structure where cleanliness is important, the engineer may devote his entire attention to designing well-functioning smooth structures for good mixing and easy cleaning of the agitator assembly. The discs at the ends of the shaft serve to balance the assembled structure.

Accordingly, it is the principal object of this invention to provide a novel balancing device.

It is a further object of this invention to provide a novel balancing device which is quickly adjusted to different balancing requirements by rotating parts thereof relative to other parts thereof or by rotating all parts thereof on a shaft on which it is employed.

It is a further object of this invention to provide an adjustable balancing device that is as secure in one position of adjustment as any other position of adjustment.

Yet another object of this invention is to provide a novel balancing device that offers a minimum of hazard to personnel in the vicinity in that it has a substantially circular periphery.

It is a still further object of this invention to provide a balancing device that can be adjusted without disassembling the machine with which it is used.

Still further objects of this invention are inherent in the particular structures shown and described herein.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which.

Figure 1:
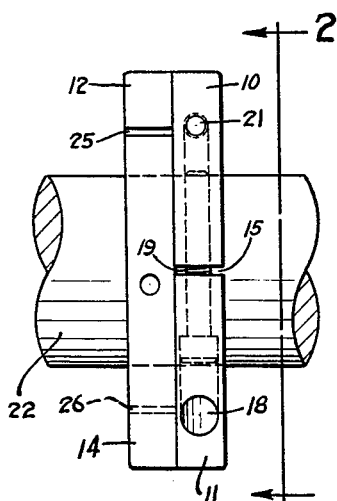
FIGURE 1 is a side elevation of the invention shown on a fragment of the shaft.

In FIGURE 1 the invention is illustrated as composed of two divided discs, the halves of which are designated 10—11 for the right-hand disc and 12—14 for the left-hand disc. Neither of these disc halves is a complete semicircle which means that there is a slight clearance as at 15 and 16 for disc 10—11 between the ends of the disc halves.

Figure 2:
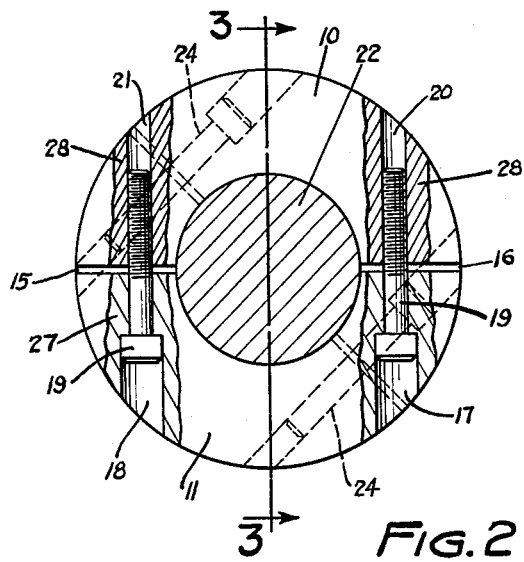
FIGURE 2 is a front elevation of the invention taken on the line 2—2 of FIGURE 1; portions of the nearer disc are broken away to illustrate the bolt structure and hidden parts are shown with broken lines.

As shown in FIGURE 2, one half of each balancing disc is provided with counterbores such as those shown at 17 and 18 into which the bolts 19 are inserted. A pair of threaded wells 20 and 21 in the other half of the balancing disc receives the threads of bolts 19. After the disc is on the shaft and the bolts are tightened lightly, the disc may still be rotated around the shaft in order to create the desired balancing situation. Once the correct balancing location for the disc is discovered, bolts 19 can be tightened securely to clamp the disc to the shaft 22 at the desired location.

Bolts 24 shown in broken lines in FIGURE 2 are mounted in similar counterbores and threaded wells in the disc 12—14 as those provided for bolts 19 in disc 10—11. As in the case of disc 10—11, the disc 12—14 is provided with the spaces 25 and 26 between the ends of the two halves to permit tightening the disc portions on the shaft 22.

Figure 3:
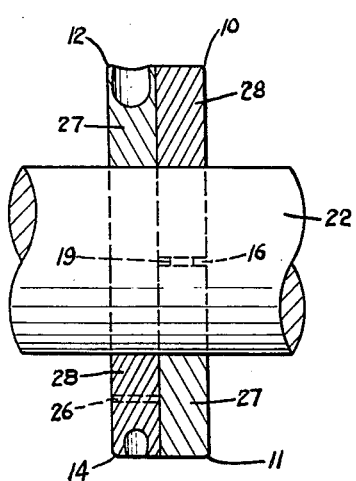
FIGURE 3 is a vertical section taken on the line 3—3 of FIGURE 2.
Figure 4:
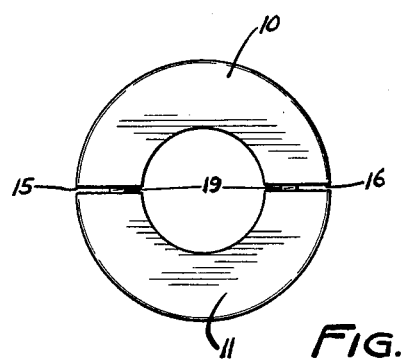
FIGURE 4 is a front elevation at a reduced scale of the nearer one of the discs shown in FIGURE 2 and in the same position as illustrated therein.
Figure 5:
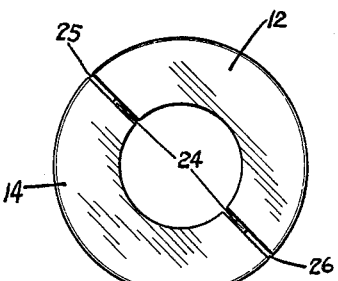
FIGURE 5 is a similar side elevation at the same scale as FIGURE 4 of the back disc in FIGURE 2.

Each of the discs has a heavier portion and a lighter portion, the difference in weight between the portions being created in any suitable manner but preferably by making them of materials of unlike specific gravity. A pair of materials that has been found very satisfactory is iron for the heavier disc portions and aluminum for the lighter disc portions. As shown in FIGURES 2 and 3, widely spaced crosshatching, as at 27, illustrates the less dense aluminum while the closer crosshatching 28 represents the more dense iron. In the preferred embodiment illustrated, each of the disc halves is substantially the same size as any other disc half so that a pair of discs provide a substantially smooth periphery. As mentioned above, difference in weight between the halves of any one disc is best achieved by the use of materials having different specific gravity. While other techniques could be employed to alter the weight of one disc half as compared to another, the use of materials or different specific gravity is preferred; because it permits forming readily all parts to the same exterior size to produce the smooth periphery referred to above. A balancing device could be made that would achieve its effect by having portions that extend farther from the center of rotation than other parts whereby greater centrifugal force would be generated at one point as compared to another. Such balancing device would be capable of counterbalancing undesirable weights and thereby avoid vibration, but it would be hazardous in that it would have protruding portions that could deliver dangerous blows to personnel accidentally coming into contact with them.

With bolts 19 and 24 loosened, both discs can be rotated around the shaft and located in any desired rotational angular relationship to the shaft and also to each other. For this reason, the relationship between the heavier portions 10 and 14 and the lighter portions 11 and 12 is not material except that the sum of the weight of the heavier portions should be sufficiently different than the weight of the lighter portions to provide the maximum counterbalance effect needed for the particular installation. To obtain the most delicate balancing, all the lighter elements should be equal to each other and all the heavier elements should be equal to each other. Likewise, bolts that are substantially of identical size and weight should be employed. The depth of the counterbores 17 and 18 should be consistent. Once the discs are arranged on shaft 22 to obtain the necessary balancing effect, the bolts 19 and 24 are tightened securely so that the discs will remain in the desired position on the shaft.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A balancing structure comprising a pair of balancing means, each of said balancing means physically separated into a light portion and a heavy portion, the weight differential between portions of said pair of balancing means is achieved by having the lighter balancing portions constructed from a material having a lower specific gravity than said heavier balancing means portions, said two heavy portions being substantially equivalent to each other and said two light portions being substantially equivalent to each other, said balancing means portions are all of the same external dimensions.

2. The balancing structure of claim 1 in which the heavy portions of said balancing device are made of iron and the light portions thereof are made of aluminum.

3. A balancing device comprising a pair of discs, said discs being divided into equal-size halves and open in the center to receive a shaft, said disc halves being less than semicircular whereby, when said disc halves are placed together, the openings in the center thereof are less than true circles, one half of each of said discs being made of a relatively heavy material, the other of said half of each of said discs being made of a relatively light material, counterbored passages in each of said light disc halves to receive bolts, threaded bores in each of said heavy halves to receive the threaded end of said bolts, and bolts in said counterbores and threading into said threaded wells to releasably draw said disc halves toward each other; whereby said discs placed on a shaft may be positioned in any rotational angular position relative to each other and to the shaft and secured thereon in a selected position by tightening said bolts.

4. The balancing structure of claim 3 in which the light disc halves are made of aluminum and the heavy disc halves are made of iron.

References Cited in the file of this patent

UNITED STATES PATENTS

| | | |
|---|---|---|
| 402,564 | Collier | May 7, 1889 |
| 860,336 | Schultz | July 16, 1907 |
| 882,037 | Wetherill et al. | Mar. 7, 1908 |
| 1,532,843 | Stubbs | Apr. 7, 1925 |
| 1,645,343 | Moorehouse | Oct. 11, 1927 |
| 1,928,245 | Bloss et al. | Sept. 26, 1933 |
| 2,474,370 | Russell | June 28, 1949 |
| 2,873,072 | Farkas | Feb. 10, 1959 |
| 2,887,902 | MacMillan | May 26, 1959 |

FOREIGN PATENTS

| | | |
|---|---|---|
| 216,548 | Great Britain | May 26, 1924 |
| 13,378 | Netherlands | Nov. 16, 1925 |